United States Patent
Zhang et al.

(10) Patent No.: US 12,489,920 B2
(45) Date of Patent: Dec. 2, 2025

(54) METHOD AND APPARATUS FOR PREDICTIVELY CODING AND DECODING DEPTH INFORMATION OF POINT CLOUD

(71) Applicant: Honor Device Co., Ltd., Shenzhen (CN)

(72) Inventors: Wei Zhang, Shenzhen (CN); Fuzheng Yang, Shenzhen (CN); Ke Zhang, Shenzhen (CN); Jiarun Song, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 58 days.

(21) Appl. No.: 18/039,633

(22) PCT Filed: May 18, 2022

(86) PCT No.: PCT/CN2022/093614
§ 371 (c)(1),
(2) Date: May 31, 2023

(87) PCT Pub. No.: WO2022/247704
PCT Pub. Date: Dec. 1, 2022

(65) Prior Publication Data
US 2024/0007669 A1    Jan. 4, 2024

(30) Foreign Application Priority Data
May 26, 2021   (CN) .......................... 202110580227.8

(51) Int. Cl.
*H04N 19/597* (2014.01)
*H04N 19/105* (2014.01)

(52) U.S. Cl.
CPC ......... *H04N 19/597* (2014.11); *H04N 19/105* (2014.11)

(58) Field of Classification Search
CPC .... H04N 19/597; H04N 19/105; H04N 19/50; H04N 13/128; H04N 13/161; H04N 2013/0081; G06T 9/001; G06T 9/004
See application file for complete search history.

(56) References Cited

U.S. PATENT DOCUMENTS

| | | |
|---|---|---|
| 11,010,931 B2 | 5/2021 | Yea et al. |
| 11,625,809 B2 | 4/2023 | Ricard et al. |

(Continued)

FOREIGN PATENT DOCUMENTS

| | | |
|---|---|---|
| CN | 109657559 A | 4/2019 |
| CN | 110996098 A | 4/2020 |

(Continued)

OTHER PUBLICATIONS

Jae-Kyun Ahn et al., "Large-Scale 3D Point Cloud Compression Using Adaptive Radial Distance Prediction in Hybrid Coordinate Domains", Selected Topics in Signal Processing, IEEE Journal of. 9. pp. 422-434, Nov. 13, 2014.

(Continued)

*Primary Examiner* — Tat C Chio
(74) *Attorney, Agent, or Firm* — Slater Matsil, LLP

(57) ABSTRACT

A method for coding includes: obtaining original point cloud data; creating an adaptive prediction list of the depth information of the point cloud; and predictively coding the depth information of the point cloud based on the adaptive prediction list, to obtain codestream information. According to the present invention, an adaptively updated prediction list of the depth information is created, and an optimal prediction mode is selected from the list to predict the depth information of the point cloud.

20 Claims, 4 Drawing Sheets

(56) References Cited

U.S. PATENT DOCUMENTS

| | | | |
|---|---|---|---|
| 2016/0366442 A1* | 12/2016 | Liu | ................ H04N 19/53 |
| 2018/0053324 A1 | 2/2018 | Cohen et al. | |
| 2020/0296401 A1 | 9/2020 | Lee et al. | |
| 2020/0302632 A1 | 9/2020 | Oh et al. | |
| 2020/0381022 A1 | 12/2020 | Ilola et al. | |
| 2021/0375004 A1 | 12/2021 | Sugio et al. | |
| 2022/0108484 A1 | 4/2022 | Ray et al. | |
| 2022/0215596 A1* | 7/2022 | Van der Auwera | .... H04N 19/25 |
| 2022/0398784 A1 | 12/2022 | Taquet et al. | |

FOREIGN PATENT DOCUMENTS

| | | |
|---|---|---|
| CN | 112218079 A | 1/2021 |
| CN | 112565734 A | 3/2021 |
| CN | 112673398 A | 4/2021 |
| TW | 202037169 A | 10/2020 |
| WO | 2020014011 A1 | 1/2020 |
| WO | 2020175708 A1 | 9/2020 |
| WO | 2020190097 A1 | 9/2020 |
| WO | 2020246689 A1 | 12/2020 |
| WO | 2021084292 A1 | 5/2021 |

OTHER PUBLICATIONS

Simone Milani et al.,"A Transform Coding Strategy for Dynamic Point Clouds," in IEEE Transactions on Image Processing, vol. 29, pp. 8213-8225, Dec. 21, 2020.

Jonathan Taquet(Xiaomi) et al: "[G-PCC][New]EE13.51 related—Improved List of Predictors", 134. MPEG Meeting; Apr. 26-Apr. 30, 20210 ; Online; (Motion Picture Expert Group or ISO/IEC JTC1/SC29/WG11), No. m5674421 Apr. 2021 (Apr. 21, 2021), total 12 pages, XP030295304.

Jonathan Taquet(Xiaomi) et al: "[G-PCC][New]EE13.51 related—Improved List of Predictors", 134. MPEG Meeting; Apr. 26-Apr. 30, 2021 ; Online; (Motion Picture Expert Group or ISO/IEC JTC1/SC29/WVG11), No. m5674421 Apr. 2021 (Apr. 21, 2021), total 5 pages, XP030295305.

S. Schwarz et al., "Emerging MPEG Standards for Point Cloud Compression," in IEEE Journal on Emerging and Selected Topics in Circuits and Systems, vol. 9, No. 1, pp. 133-148, Mar. 2019.

* cited by examiner

METHOD AND APPARATUS FOR PREDICTIVELY CODING AND DECODING DEPTH INFORMATION OF POINT CLOUD

CROSS-REFERENCE TO RELATED APPLICATIONS

This application is a national stage of International Application No. PCT/CN2022/093614, filed on May 18, 2022, which claims priority to Chinese Patent Application No. 202110580227.8, filed on May 26, 2021, both of which are incorporated herein by references in their entireties.

TECHNICAL FIELD

The present invention pertains to the field of coding and decoding technologies for a point cloud, and in particular, to a method and an apparatus for predictively coding and decoding depth information of a point cloud.

BACKGROUND

With the improvement of a capability of hardware processing and the rapid development of computer vision, 3D point cloud data has been widely applied to virtual reality, augmented reality, autonomous driving, environment modeling, and the like. However, a large-scale point cloud usually has a large amount of data, which is extremely not conducive to transmission and storage of point cloud data. Therefore, the large-scale point cloud needs to be coded and decoded efficiently.

In existing technologies for coding and decoding a point cloud, cylindrical coordinate information (including depth information, azimuth information, and the like) of the point cloud is usually used to assist in coding Cartesian coordinate information. Therefore, in the prior art, each cylindrical coordinate component of the point cloud needs to be predictively coded. Specifically, for predictively coding the depth information of the point cloud, in a method for coding and decoding a point cloud based on 2D regularized planar projection provided in a prior art 1, first, it may be determined whether to fill, with depth information, an empty pixel in a depth information image obtained by 2D planar projection; second, depth information of a current pixel is predicted based depth information of a coded pixel and occupancy information; then, it may be determined whether to quantify a predicted residual of the depth information; and finally, the predicted residual of the depth information is coded to generate a compressed bitstream of the depth information image. In a method for coding and decoding a point cloud based on a prediction tree provided in a prior art 2, for each node in the prediction tree, an optimal prediction mode needs to be selected from a fixed prediction mode list, to obtain a predicted value and predicted residual of depth information of a current node. Finally, a prediction mode selected for coding and the predicted residual of depth information may be used to recreate depth information of a point cloud in a same manner at a decoding end. In a method for coding and decoding a point cloud based on a single-chain structure provided in a prior art 3, when depth information of a point cloud is predictively coded, first, an adaptively updated prediction mode list is created. The list is updated based on a rule. Specifically, an existing value in the prediction list is removed based on a predicted value corresponding to a prediction mode selected for a previously coded point of a point to be coded currently, and depth information of the previously coded point of the point to be coded currently is inserted into a first position in the prediction mode list. Then, an optimal prediction mode is selected at a coding end, to obtain a predicted residual of depth information of a current point. Finally, a prediction mode selected for coding and the predicted residual of the depth information may be used for prediction and recreation of the depth information at a decoding end in a same manner.

However, because the depth information of the point cloud is closely related to a scenario, and only depth information of a neighboring point is used for prediction in the foregoing method, without considering discontinuity of an actual scenario. Consequently, the obtained predicted residual of depth information is great, prediction accuracy is low, and a plurality of outliers and hop values exist, which affects coding efficiency.

SUMMARY

To resolve the foregoing problems in the prior art, the present invention provides a method and an apparatus for predictively coding and decoding depth information of a point cloud. Technical problems are to be resolved in the present invention in the following technical solutions:

A method for predictively coding depth information of a point cloud is provided. The method includes:
  obtaining original point cloud data;
  creating an adaptive prediction list of the depth information of the point cloud; and
  predictively coding the depth information of the point cloud based on the adaptive prediction list, to obtain codestream information.

In an embodiment of the present invention, the creating an adaptive prediction list of the depth information of the point cloud includes:
  creating several candidate lists of the depth information of a point to be coded currently; and
  selecting a value from the candidate list to fill a prediction list, to obtain the adaptive prediction list.

In an embodiment of the present invention, the creating several candidate lists of the depth information of a point to be coded currently includes:
  creating at least one of a first candidate list, a second candidate list, a third candidate list, or a fourth candidate list, where
  a depth information value of a coded point collected by a laser the same as a laser for collecting a depth information value of the point to be coded currently is stored in the first candidate list;
  a depth information value of a coded point collected by a laser different from a laser for collecting a depth information value of the point to be coded currently is stored in the second candidate list;
  a depth information value of a historically coded point is stored in the third candidate list; and
  a priori depth information value is stored in the fourth candidate list.

In an embodiment of the present invention, creating the first candidate list includes:
  initializing a size of the first candidate list; and
  inserting a depth information value of a currently coded point into an end of the first candidate list if the first candidate list is not filled currently; and updating the first candidate list based on a first-in-first-out principle if the first candidate list is filled currently.

In an embodiment of the present invention, creating the second candidate list includes:

initializing a size of the second candidate list; and inserting a depth information of a coded point within a scope right above the point to be coded currently into the second candidate list if the second candidate list is not filled currently, and a point collected by previous q lasers of a current laser has been coded.

In an embodiment of the present invention, creating the third candidate list includes:

initializing a size of the third candidate list; and inserting a depth information value of a currently coded point into an end of the third candidate list if the third candidate list is not filled currently; and selectively removing a value in the third candidate list based on a preset threshold, and inserting the depth information value of the currently coded point into the end of the list, if the third candidate list is filled currently.

In an embodiment of the present invention, the selecting a value from the candidate list to fill a prediction list, to obtain the adaptive prediction list includes:

initializing a size of the prediction list;

selecting a value of a quantity from several candidate lists in an order, and filling the value of a quantity into the prediction list; and adjusting an order of values in the prediction list, to obtain the adaptive prediction list.

In an embodiment of the present invention, the selecting a value of a quantity from several candidate lists in an order, and filling the value of a quantity into the prediction list includes:

inserting a depth information value in the first candidate list into the prediction list, and selectively inserting another depth information value in the first candidate list into the prediction list based on a first threshold;

selectively inserting a depth information value in the second candidate list into the prediction list based on a second threshold when it is determined that the prediction list is not filled currently;

selectively inserting a depth information value in the third candidate list into the prediction list based on a third threshold when it is determined that the prediction list is not filled currently; and successively inserting a value in the fourth candidate list into a remaining position of the prediction list when it is determined that the prediction list is not filled currently.

Another embodiment of the present invention provides an apparatus for predictively coding depth information of a point cloud. The method includes:

a data obtaining module, configured to obtain original point cloud data;

a first calculating module, configured to create an adaptive prediction list of the depth information of the point cloud; and a predictive coding module, configured to predictively coding the depth information of the point cloud based on the adaptive prediction list, to obtain the codestream information.

Another embodiment of the present invention further provides a method for predictively decoding depth information of a point cloud. The method includes:

obtaining codestream information and performing decoding;

creating an adaptive prediction list of the depth information of the point cloud; and recreating the depth information of the point cloud based on the adaptive prediction list and a prediction mode and predicted residual obtained through decoding, to obtain recreated depth information of the point cloud.

Another embodiment of the present invention still further provides an apparatus for predictively decoding depth information of a point cloud. The method includes:

a decoding module, configured to obtain codestream information and perform decoding;

a second calculating module, configured to create an adaptive prediction list of the depth information of the point cloud; and a recreating module, configured to recreate the depth information of the point cloud based on the adaptive prediction list and a prediction mode and predicted residual obtained through decoding, to obtain recreated depth information of the point cloud.

Beneficial effects brought by the present invention are as follows.

According to the present invention, an adaptively updated prediction list of the depth information is created, and an optimal predicted value is selected from the list to predict the depth information of the point cloud. Therefore, discontinuity of the depth information of the point cloud caused by discontinuity of an actual scenario is resolved. Accordingly, a predicted residual and a frequency of occurrence of an outlier and a hop value, of the depth information, are significantly reduced, and prediction accuracy and coding efficiency are improved.

The present invention is further described below with reference to the accompanying drawings and embodiments.

DETAILED DESCRIPTION OF ILLUSTRATIVE EMBODIMENTS

The present invention is further described in detail with reference to the following specific embodiments, but implementations of the present invention are not limited to thereto.

Embodiment 1

Figure 1:
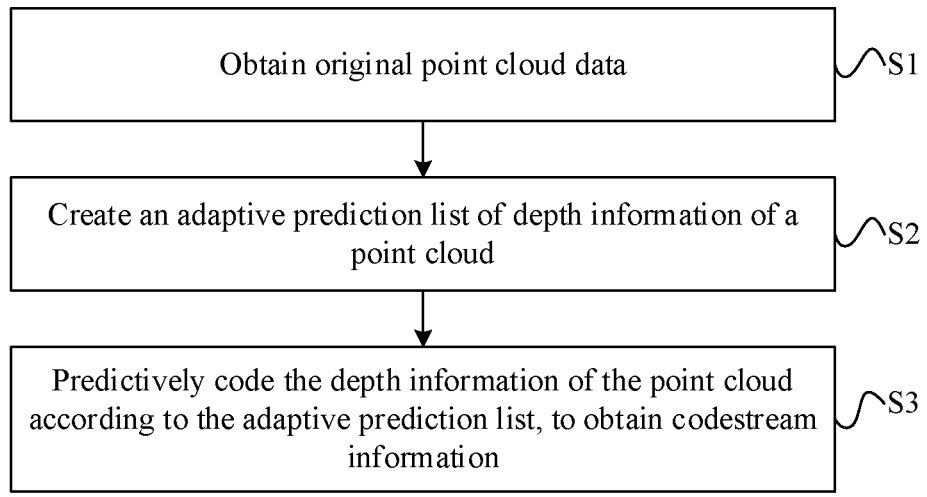
FIG. 1 is a schematic flowchart of a method for predictively coding depth information of a point cloud according to an embodiment of the present invention.

FIG. 1 is a schematic flowchart of a method for predictively coding depth information of a point cloud according to an embodiment of the present invention. The method includes the following steps.

Step 1: Obtain original point cloud data.

Specifically, the original point cloud data usually includes a group of 3D spatial points. Each spatial point records geometric position information of each spatial point, as well as additional attribute information such as a color, reflectivity, and a normal. The geometric position information of a point cloud is generally expressed based on a Cartesian coordinate system, namely, is expressed by x, y, and z coordinates of a point. The original point cloud data may be obtained through scanning by a laser radar, the laser radar includes a plurality of laser (laser scanner) combinations arranged and distributed along both sides of a central axis, and each laser has a fixed pitch angle and may be considered as a relatively independent collection system. In addition, the original point cloud data may also be obtained through a public data set provided by various platforms.

In this embodiment, it is assumed that geometric position information of the obtained original point cloud data is expressed based on the Cartesian coordinate system. It should be noted that a method for expressing the geometric position information of the original point cloud data is not limited to a Cartesian coordinate.

Step 2: Create an adaptive prediction list of the depth information of the point cloud, specifically including:

In this embodiment, the depth information of the point cloud is obtained mainly by the following calculation formula:

$$r=\sqrt{x^2+y^2};$$

r represents depth information of each point in the original point cloud data, and x and y are Cartesian coordinate components of each point respectively.

In addition, it should be noted that the depth information of the point cloud may also be calculated by a formula $r=\sqrt{x^2+y^2+z^2}$ or in another manner, where (x,y,z) are Cartesian coordinates of the point.

It can be known, by analysis of a collection principle of the laser radar, that depth information of a neighboring point in a scenario collected by the laser radar is usually similar. However, depth information of a non-neighboring point collected by the laser radar may also be similar to some extent due to discontinuity of the scenario. Therefore, depth information of a coded point before a point to be coded, in the point cloud needs to be saved into a series of candidate lists in a rule. Therefore, an appropriate value may be selected from the candidate list in a rule to predict depth information of a point to be coded currently.

Specifically, step 2 includes:

21) creating several candidate lists of depth information of the point to be coded currently.

In this embodiment, the candidate list of depth information may include at least one of a first candidate list List0, a second candidate list List1, a third candidate list List2, or a fourth candidate list List3.

A depth information value of a coded point collected by a laser the same as a laser for collecting a depth information value of the point to be coded currently is stored in the first candidate list.

A depth information value of a coded point collected by a laser different from a laser for collecting a depth information value of the point to be coded currently is stored in the second candidate list.

A depth information value of a historically coded point is stored in the third candidate list.

A priori depth information value is stored in the fourth candidate list.

In addition, another candidate list may be designed based on actual needs.

Processes of creating the four candidate lists are respectively described in detail below.

(a) Creating a First Candidate List List0

First, a size of the first candidate list List0 is initialized.

Specifically, in this embodiment, the size of the first candidate list List0 may be initialized to 4.

Then, the first candidate list List0 is updated based on a depth information value of a coded point collected by a same laser. The update is specifically as follows: it is determined whether the first candidate list List0 is filled or not currently. The depth information value of a currently coded point is inserted into an end of the list List0 if the first candidate list List0 is not filled currently. The first candidate list is updated based on a first-in-first-out principle, namely, a first value in the List0 is removed from the list, and the depth information of the currently coded point is inserted into the end of the List0 list, if the first candidate list List0 is filled currently.

Figure 2:
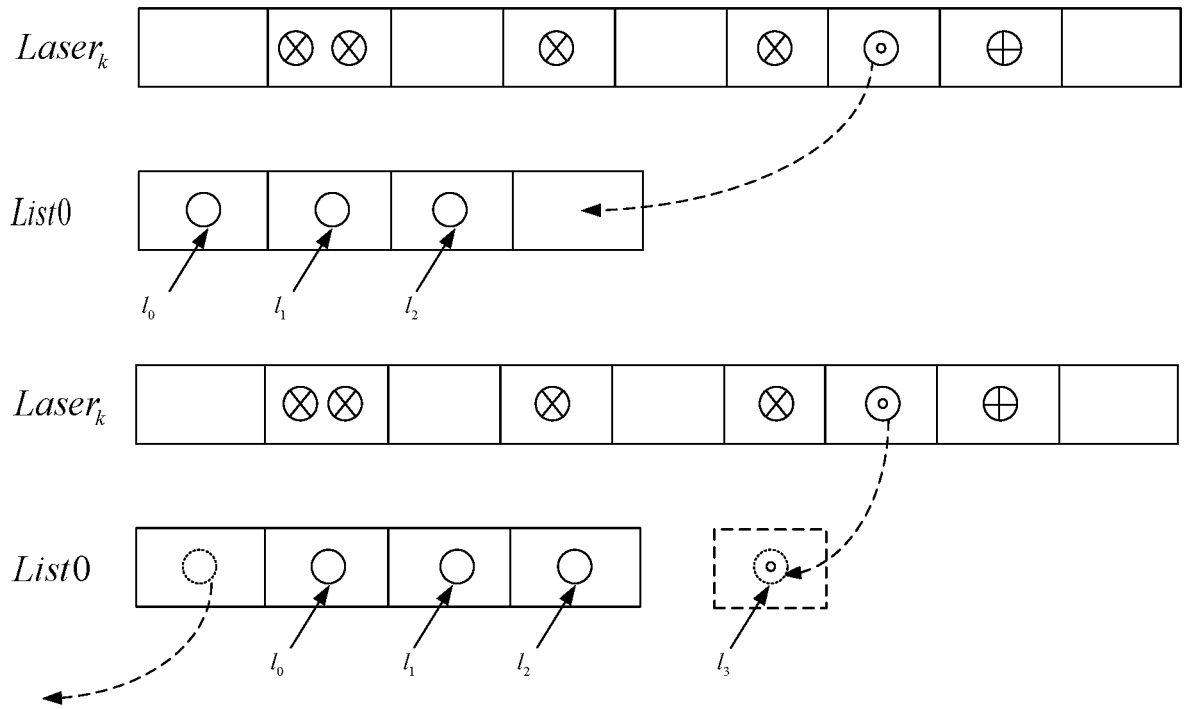
FIG. 2 is a schematic diagram of update of a first candidate list List0 according to an embodiment of the present invention.

Specifically, for example, the size of the first candidate list List0 is equal to 4. Whenever depth information of a point has been coded, the size of the first candidate list List0 needs to be determined. When the size of the list is less than 4, namely, the list is not filled, the depth information value of the currently coded point is directly inserted into the end of the list. When the size of the list is equal to 4, namely, the list is filled, a first value in the list is removed from the list, and the depth information value of the currently coded point is inserted into the end of the list. As shown in FIG. 2, FIG. 2 is a schematic diagram of update of the first candidate list List0 according to an embodiment of the present invention. In FIG. 2, ⊕ is a depth information value of a point to be coded currently, ⊚ is a depth information value of a currently coded point to be inserted, ⊗ is a depth information value of a coded point collected by a laser the same as a laser for collecting a depth information value of a current point, ○ is a depth information value existing in the List0, and ○ is a depth information value to be removed from the list.

(b) Creating a Second Candidate List List1

First, a size of the second candidate list is initialized.

Specifically, in this embodiment, the size of the second candidate list List1 may be initialized to 2.

Then, the second candidate list List1 is updated based on a depth information value of a coded point collected by a different laser. The update is specifically as follows: a depth information of a coded point within a scope right above the point to be coded currently is inserted into the second candidate list List1 if the second candidate list List1 is not filled currently, and a point collected by previous q lasers of a current laser has been coded.

Figure 3:
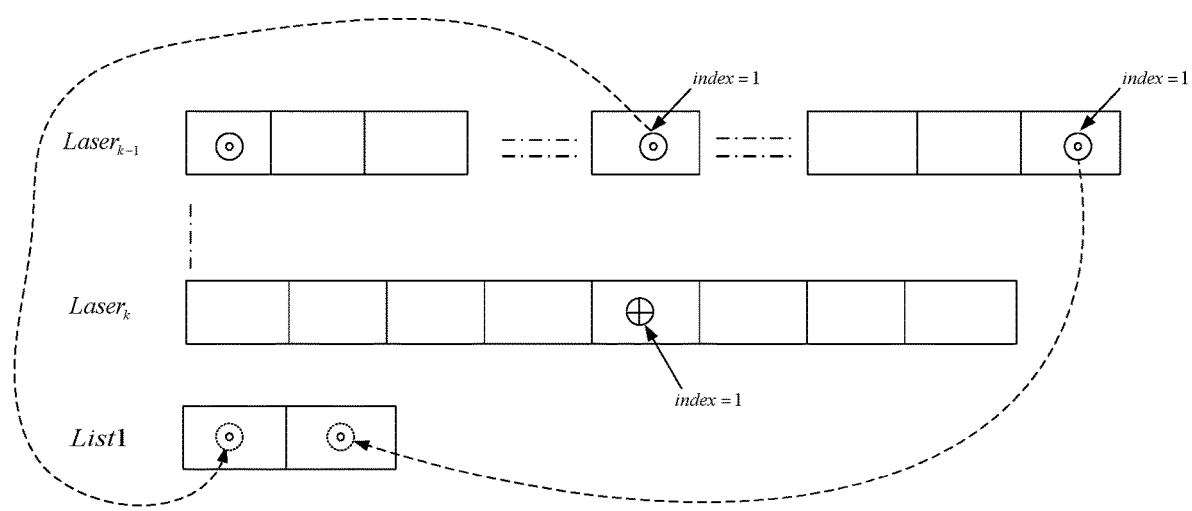
FIG. 3 is a schematic diagram of update of a second candidate list List1 according to an embodiment of the present invention.

Specifically, for example, the size of the second candidate list List1 is equal to 2. Whenever depth information of a point has been coded, it is first determined whether a point collected by previous q lasers of a laser where the point to be coded currently is located have been coded. q may be a fixed value or a value that is adaptively changed with an index number of a current laser, and q is, for example, equal to 1. Next, the depth information of the point right above the point to be coded currently is inserted into the List1. If no point right above the point to be coded currently exists, the depth information of the point is filled with a value of a depth information value of a point within a scope on an upper left or upper right of the point to be coded currently or a linear combination of the depth information value. Finally, a depth information value of a coded point with a distance of D from a point, in a previous laser, right above the point to be coded currently is selected and inserted into the List1. D may be a positive value or a negative value, a fixed value, or a value that is adaptively changed with a position of the point to be coded currently. When D is the positive value, it indicates the upper right of the point to be coded currently. When D is the negative value, it indicates the upper left of the point to be coded currently. As shown in FIG. 3, FIG. 3 is a schematic diagram of update of the second first candidate list List1 according to an embodiment of the present invention. In FIG. 3, ⊕ is a depth information value of a point to be coded currently, and ⊙ is a depth information value of the currently coded point to be inserted.

(c) Creating a Third Candidate List List2

First, a size of the third candidate list List2 is initialized.

Specifically, in this embodiment, the size of the third candidate list List2 may be initialized to 5.

Then, the third candidate list List2 is updated based on a depth information value of a historically coded point. The update is specifically as follows: it is determined whether the third candidate list List2 is filled or not currently. A depth information value of a currently coded point is inserted into an end of the third candidate list List2 if the third candidate list List2 is not filled currently. A value in the third candidate list is selectively removed based on a preset threshold, and the depth information value of the currently coded point is inserted into the end of the list List2, if the third candidate list List2 is filled currently.

Figure 4:
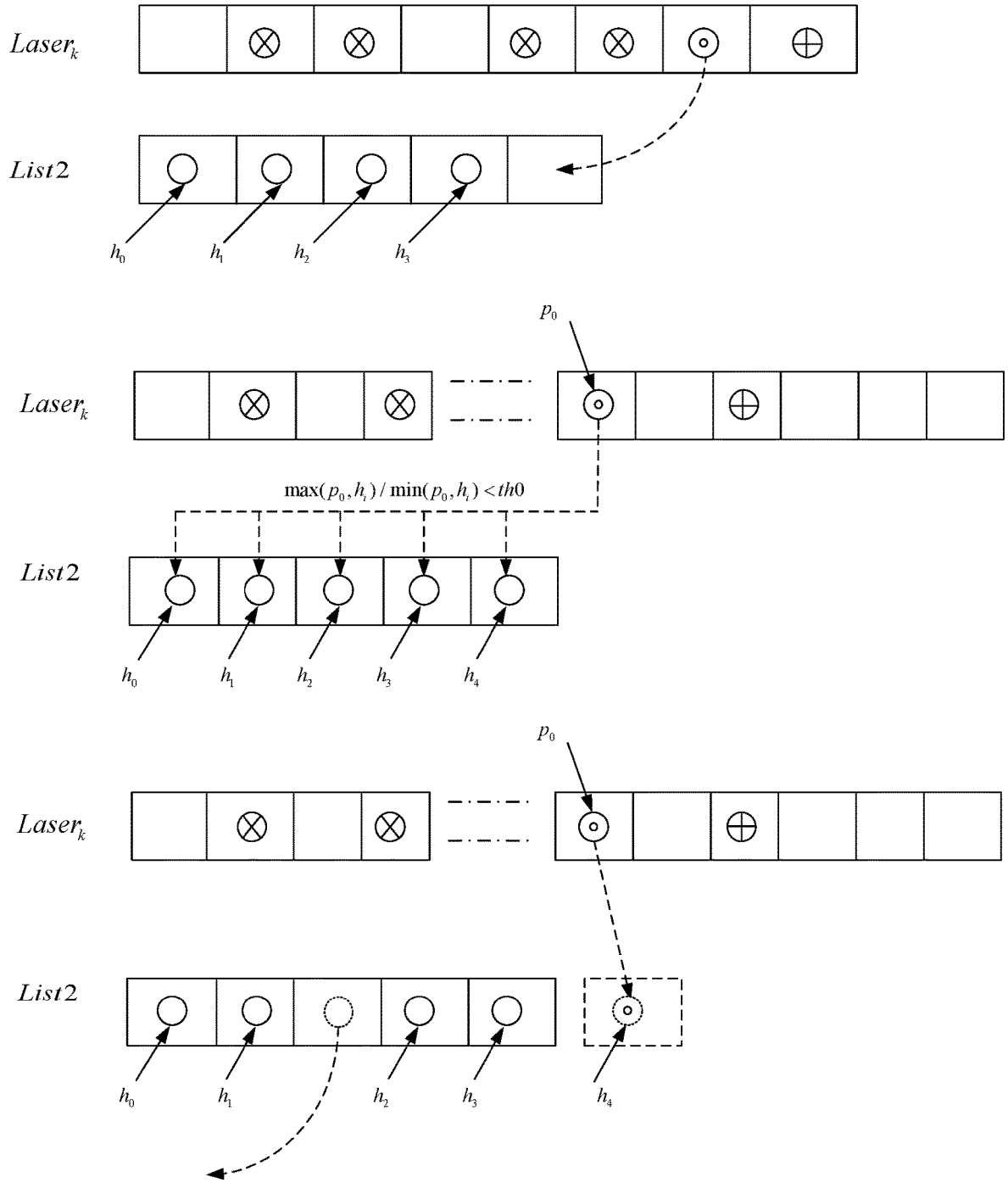
FIG. 4 is a schematic diagram of update of a third candidate list List2 according to an embodiment of the present invention.

Specifically, for example, the size of the third candidate list List2 is equal to 5. Whenever depth information of a point has been coded, the size of the third candidate list List2 needs to be determined. When the size of the list is less than 5, namely, the list is not filled, the depth information value of the currently coded point is directly inserted into the end of the List2. When the size of the list is equal to 5, namely, the list is filled, it is determined, based on a preset threshold $th_0$, whether the depth information value of the currently coded point should be inserted into the List2. Specifically, redundancy is checked first. When a ratio of the depth information value $p_0$ of the currently coded point to be inserted to a depth information value $h_i$ in the list (a ratio of a large value between $p_0$ and $h_i$ to a small value between them) is less than $th_0$, a first $h_i$ that meets this condition is removed from the list, and $p_0$ is inserted into the end of the list. As shown in FIG. 4, FIG. 4 is a schematic diagram of update of the third candidate list List2 according to an embodiment of the present invention. In FIG. 4, ⊕ is a depth information value of a point to be coded currently, ⊗ is depth information value of a coded point collected by a laser the same as a laser for collecting a depth information of a current point, ○ is a depth information value existing in the List2, ⊙ is a depth information value of a currently coded point to be inserted, and ○ is a depth information value to be removed from the list.

In addition, it should be noted that a life cycle of the List2 is a quantity of points scanned by one laser, namely, after depth information of all points scanned by one laser has been coded, the List2 is empty, so that depth information of a point scanned by a next laser is coded.

(d) Creating a Fourth Candidate List List3

First, a size of the fourth candidate list List3 is initialized.

Specifically, in this embodiment, the size of the fourth candidate list List3 may be initialized to 4.

Next, depth information is divided into several intervals with a same size as the fourth candidate list List3.

Specifically, it is considered that the depth information is generally in a range of [0, $2^{32}-1$], namely, the depth information is expressed by 32 bits at most, and the depth information is coded mostly with effective bits. Therefore, before the depth information is predictively coded, the depth information may be divided into several intervals with a same size as the fourth candidate list List3 based on a quantity of bits. For example, the depth information may be divided into four intervals based on the quantity of bits, which are [0, $2_8-1$], [$2_8$, $2_{16}-1$], [$2_{16}$, $2_{24}-1$], and [$2_{24}$, $2^{32}-1$] successively.

Finally, a value is selected from each interval to fill the fourth candidate list List3.

Specifically, if the depth information is divided into the following four intervals based on the quantity of bits: [0, $2_8-1$], [$2^8$, $2^{16}-1$], [$2^{16}$, $2^{24}-1$], and [$2^{24}$, $2^{32}-1$], a value may be selected from each of the four intervals, such as 128, 32640, 65536, or 16777216, to fill the fourth candidate list List3.

By far, creation of required candidate lists of depth information is completed.

22) A value is selected from the candidate list to fill a prediction list, to obtain the adaptive prediction list.

First, a size of the prediction list is initialized.

Specifically, in this embodiment, the size of the prediction list may be initialized to 4. It should be noted that a size of a prediction list is the same for all points to be coded.

Then, a value of a quantity is selected from several candidate lists in an order, and filled into the prediction list.

For example, the four candidate lists are created in this embodiment, and a corresponding value may be selected, in order from the first candidate list to the fourth candidate list, to fill the prediction list. Details are as follows.

A (preferably a first) depth information value in the first candidate list is inserted into the prediction list, and another depth information value in the first candidate list is selectively inserted into the prediction list based on a first threshold.

a depth information value in the second candidate list is selectively inserted into the prediction list based on a second threshold when it is determined that the prediction list is not filled currently.

a depth information value in the third candidate list is selectively inserted into the prediction list based on a third threshold when it is determined that the prediction list is not filled currently.

a value in the fourth candidate list is successively inserted into a remaining position of the prediction list when it is determined that the prediction list is not filled currently.

Selection of each candidate list is described in detail below.

For the first candidate list List0, it is assumed that the prediction list is filled with m values at most selected from the first candidate lists List0, where m is not fixed. For example, m is equal to 3. A specifically manner is as follows.

a. A first depth information value in the List0 may be inserted into the prediction list.

b. It is determined whether a ratio of another depth information value in the List0 to a depth information value currently inserted into the prediction list is greater than a first threshold $T_0$, If the ratio is greater than $T_0$, a corresponding depth information value in the List0 is inserted into the prediction list, If the ratio is not greater than $T_0$, the depth information value is not inserted.

c. If a quantity $m_0$ of values in the List0 inserted into the prediction list is less than m, depth information in previous m−m₀ List0 with a greatest difference from depth information currently inserted into the prediction list is inserted into the prediction list.

For the second candidate list List1,
a depth information value in the second candidate list is selectively inserted into the prediction list based on a second threshold when it is determined that the prediction list is not filled currently.

It is assumed that the prediction list is filled with at most n values from the second candidate list List1, where n may be fixed or adaptively changed with a size of the prediction list. For example, n is equal to 1. A specific manner is as follows.

It is determined whether a ratio of a depth information value in the List1 to a depth information value in a current prediction list is greater than a second threshold $T_1$. If the ratio is greater than $T_1$, the depth information value in the List1 is inserted into the prediction list. otherwise, the depth information value is not inserted.

For the third candidate list List2,
a depth information value in the third candidate list is selectively inserted into the prediction list based on a third threshold when it is determined that the prediction list is not filled currently.

It is assumed that the prediction list is filled with at most k values from the third candidate list List2, where k may be fixed or adaptively changed with a size of the prediction list. For example, k is equal to 1. A specific manner is as follows.

It is determined whether a ratio of a depth information value in the List2 to a depth information value in a current prediction list is greater than a third threshold $T_2$. If the ratio is greater than $T_2$, the depth information value in the List2 is inserted into the prediction list, otherwise, the depth information value is not inserted.

For the fourth candidate list List3,
a value in the fourth candidate list is successively inserted into a remaining position of the prediction list when it is determined that the prediction list is not filled currently.

Finally, an order of values in the prediction list is adjusted, to obtain the adaptive prediction list.

In consideration of a scanning characteristic of the laser radar, for example, when a scanned object is a person or a tree, depth information of a point scanned by different lasers is more similar than depth information of a neighboring point scanned by a same laser in some cases. Therefore, based on a rule, the order of values in the prediction list may be appropriately adjusted to adapt to a change in a scenario.

In this embodiment, the order may be adjusted based on a difference in depth information values in the prediction list.

For example, a difference between a depth information value filled in the prediction list and a depth information value not filled in the prediction list in the second candidate list List1 may be calculated. When the difference is greater than a threshold, the depth information value filled in the prediction list is exchanged with a value in the forefront of the prediction list.

It should be noted that, in this embodiment, the first threshold $T_0$, the second threshold $T_1$, and the third threshold $T_2$ are not fixed, and may be all updated with coding.

Specifically, the foregoing threshold may be updated based on depth information of a previously coded point and a predicted value of depth information selected for the previously coded point. For example, the threshold may be updated to a ratio of the depth information of the previously coded point and the predicted value for the previously coded point.

Step 3: Predictively code the depth information of the point cloud based on the adaptive prediction list, to obtain codestream information.

Specifically, after a corresponding prediction list is created for each point to be coded, a prediction mode with lowest costs may be selected from the prediction list through an existing rate-distortion optimization technology, to predict depth information of a point to be coded currently, and a predicted residual of the depth information may be obtained. Then, an existing entropy coding technology is used to code the selected prediction mode and the predicted residual of the depth information, to obtain the codestream information. At a decoding end, the depth information of the point cloud may be recreated only by synchronously creating the adaptive prediction list of the point cloud and parsing the prediction mode and the predicted residual of the depth information in the codestream.

In this embodiment, the adaptively updated candidate list of depth information is created, the prediction list is created based on the candidate list, and an optimal predicted value is selected to predict the depth information of the point cloud. Therefore, discontinuity of the depth information of the point cloud caused by discontinuity of an actual scenario can be resolved. Accordingly, a predicted residual and a frequency of occurrence of an outlier and a hop value, of the depth information, are significantly reduced, and prediction accuracy and coding efficiency are improved.

Embodiment 2

Figure 5:
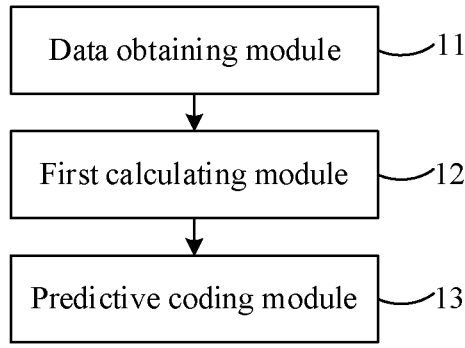
FIG. 5 is a schematic structural diagram of an apparatus for predictively coding depth information of a point cloud according to an embodiment of the present invention.

Based on the foregoing Embodiment 1, this embodiment provides an apparatus for predictively coding the depth information of a point cloud. FIG. 5 is a schematic structural diagram of an apparatus for predictively coding depth information of a point cloud according to an embodiment of the present invention. The apparatus includes:
a data obtaining module 11, configured to obtain original point cloud data;
a first calculating module 12, configured to create the adaptive prediction list of the depth information of the point cloud; and
a predictive coding module 13, configured to predictively coding the depth information of the point cloud based on the adaptive prediction list, to obtain the codestream information.

The apparatus provided in this embodiment can implement the coding method provided in the foregoing Embodiment 1. Details are not described herein again.

Embodiment 2

Figure 6:
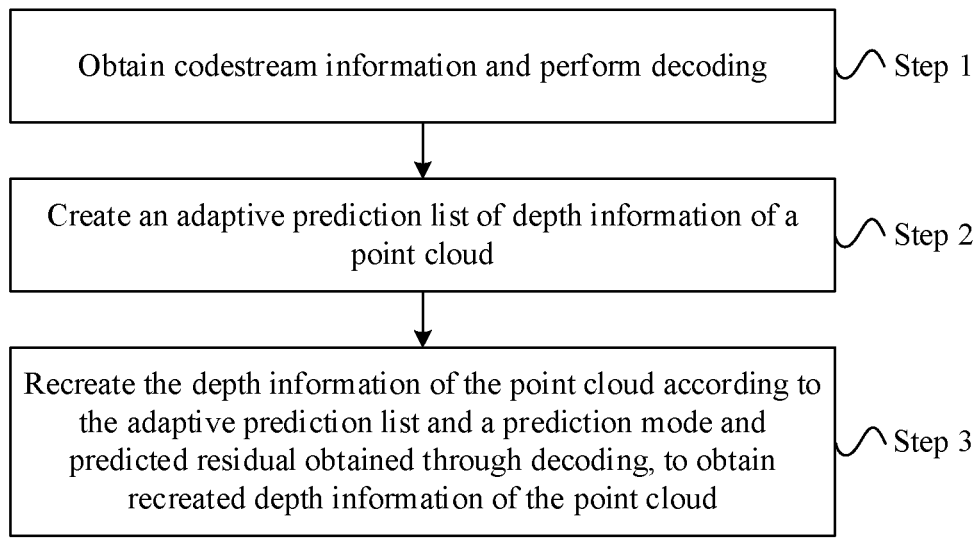
FIG. 6 is a schematic flowchart of a method for predictively decoding depth information of a point cloud according to an embodiment of the present invention.

This embodiment provides a method for predictively decoding depth information of a point cloud. FIG. 6 is a schematic flowchart of the method for predictively decoding depth information of a point cloud according to an embodiment of the present invention. The method specifically includes the following steps.

Step 1: Obtain codestream information and perform decoding.

Specifically, data obtained through decoding includes a prediction mode and predicted residual of the depth information of the point cloud.

Step 2: Create an adaptive prediction list of the depth information of the point cloud.

In this embodiment, for creation of the adaptive prediction list of the depth information of the point cloud, reference may be made to the method for the coding end in the Embodiment 1. Details are not described herein again.

Step 3: Recreate the depth information of the point cloud based on the adaptive prediction list and the prediction mode and predicted residual obtained through decoding, to obtain recreated depth information of the point cloud.

First, based on the prediction mode obtained through decoding, a corresponding value is selected from the adaptive prediction list as a predicted value of the depth information of the point cloud.

Then, the recreated depth information of the point cloud may be obtained by adding the obtained predicted value and the predicted residual obtained through decoding.

Embodiment 4

Figure 7:
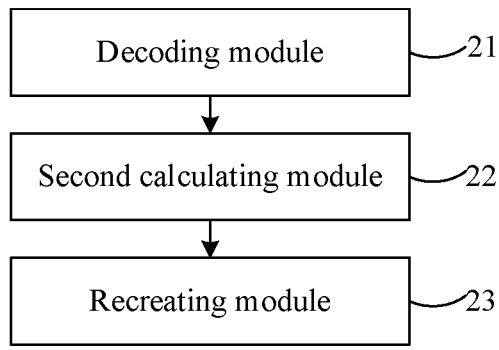
FIG. 7 is a schematic structural diagram of an apparatus for predictively decoding depth information of a point cloud according to an embodiment of the present invention.

Based on the foregoing Embodiment 3, this embodiment provides an apparatus for predictively the decoding depth information of the point cloud. FIG. 7 is a schematic diagram of an apparatus for predictively decoding depth information of a point cloud according to an embodiment of the present invention. The apparatus includes:

A decoding module 21, configured to obtain codestream information and perform decoding;
  a second calculating module 22, configured to create the adaptive prediction list of the depth information of the point cloud; and
  a recreating module 23, configured to recreate the depth information of the point cloud based on the adaptive prediction list and a prediction mode and the predicted residual obtained through decoding, to obtain recreated depth information of the point cloud.

The apparatus provided in this embodiment can implement the decoding method provided in the foregoing Embodiment 3. Details are not described herein again.

The foregoing are further detailed descriptions of the present invention with reference to specific preferred implementations, and it cannot be considered that the implementations of the present invention are only limited to these descriptions. A person of ordinary skill in the art to which the present invention belongs may make simple deductions or replacements without departing from the concept of the present invention, all of which shall be considered as falling within the protection scope of the present invention.

What is claimed is:

1. A method for predictively coding depth information of a point cloud, wherein the method comprises:
  obtaining original point cloud data;
  creating an adaptive prediction list of the depth information of the point cloud, wherein creating the adaptive prediction list of the depth information of the point cloud comprises:
    creating a plurality of candidate lists of depth information of a point to be currently coded; and
    selecting a value from the plurality of candidate lists of depth information to fill a prediction list, to obtain the adaptive prediction list; and
  predictively coding the depth information of the point cloud based on the adaptive prediction list, to obtain codestream information;
  wherein creating the plurality of candidate lists of the depth information of the point to be currently coded comprises:
    creating the plurality of candidate lists among a first candidate list, a second candidate list, a third candidate list, or a fourth candidate list, wherein:
    depth information values of coded points collected by a laser that is a same as a laser for collecting a depth information value of the point to be currently coded are stored in the first candidate list;
    depth information values of coded points collected by a laser that is different from the laser for collecting the depth information value of the point to be currently coded are stored in the second candidate list;
    depth information values of historically coded points are stored in the third candidate list; and
    priori depth information values are stored in the fourth candidate list.

2. The method for predictively coding depth information of a point cloud according to claim 1, wherein creating the first candidate list comprises:
  initializing a size of the first candidate list; and
  inserting a depth information value of a currently coded point into an end of the first candidate list when the first candidate list is not currently filled; and updating the first candidate list based on a first-in-first-out principle when the first candidate list is currently filled.

3. The method for predictively coding depth information of a point cloud according to claim 1, wherein creating the second candidate list comprises:
  initializing a size of the second candidate list; and
  inserting a depth information of a coded point within a scope right above the point to be currently coded currently into the second candidate list when the second candidate list is not currently filled, and a point collected by previous q lasers of a current laser has been coded.

4. The method for predictively coding depth information of a point cloud according to claim 1, wherein creating the third candidate list comprises:
  initializing a size of the third candidate list; and
  inserting a depth information value of a currently coded point into an end of the third candidate list when the third candidate list is not currently filled; and selectively removing a value in the third candidate list based on a preset threshold, and inserting the depth information value of the currently coded point into the end of the list, when the third candidate list is currently filled.

5. The method for predictively coding depth information of a point cloud according to claim 1, wherein selecting the value from the plurality of candidate lists of depth information to fill the prediction list, to obtain the adaptive prediction list comprises:
  initializing a size of the prediction list;
  selecting a value of a quantity from the plurality of candidate lists in an order, and filling the value of the quantity into the prediction list; and
  adjusting an order of values in the prediction list, to obtain the adaptive prediction list.

6. The method for predictively coding depth information of a point cloud according to claim 5, wherein the selecting the value of the quantity from the plurality of candidate lists in the order, and filling the value of the quantity into the prediction list comprises:
  inserting a depth information value in the first candidate list into the prediction list, and selectively inserting another depth information value in the first candidate list into the prediction list based on a first threshold;
  selectively inserting a depth information value in the second candidate list into the prediction list based on a second threshold when it is determined that the prediction list is not filled currently;

selectively inserting a depth information value in the third candidate list into the prediction list based on a third threshold when it is determined that the prediction list is not filled currently; and successively inserting a value in the fourth candidate list into a remaining position of the prediction list when it is determined that the prediction list is not filled currently.

7. An apparatus for predictively coding depth information of a point cloud, wherein the apparatus comprises:
at least one processor, configured to:
obtain original point cloud data;
create an adaptive prediction list of the depth information of the point cloud, wherein creating the adaptive prediction list of the depth information of the point cloud comprises:
creating a plurality of candidate lists of depth information of a point to be currently coded; and
selecting a value from the plurality of candidate lists of depth information to fill a prediction list, to obtain the adaptive prediction list; and
predictively code the depth information of the point cloud based on the adaptive prediction list, to obtain codestream information;
wherein creating the plurality of candidate lists of the depth information of the point to be currently coded comprises:
creating the plurality of candidate lists among a first candidate list, a second candidate list, a third candidate list, or a fourth candidate list, wherein:
depth information values of coded points collected by a laser that is a same as a laser for collecting a depth information value of the point to be currently coded are stored in the first candidate list;
depth information values of coded points collected by a laser that is different from the laser for collecting the depth information value of the point to be currently coded are stored in the second candidate list;
depth information values of historically coded points are stored in the third candidate list; and
priori depth information values are stored in the fourth candidate list.

8. The apparatus according to claim 7, wherein creating the first candidate list comprises:
initializing a size of the first candidate list; and
inserting a depth information value of a currently coded point into an end of the first candidate list when the first candidate list is not currently filled; and updating the first candidate list based on a first-in-first-out principle when the first candidate list is currently filled.

9. The apparatus according to claim 7, wherein creating the second candidate list comprises:
initializing a size of the second candidate list; and
inserting a depth information of a coded point within a scope right above the point to be currently coded into the second candidate list when the second candidate list is not currently filled, and a point collected by previous q lasers of a current laser has been coded.

10. The apparatus according to claim 7, wherein creating the third candidate list comprises:
initializing a size of the third candidate list; and
inserting a depth information value of a currently coded point into an end of the third candidate list when the third candidate list is not currently filled; and selectively removing a value in the third candidate list based on a preset threshold, and inserting the depth information value of the currently coded point into the end of the list, when the third candidate list is currently filled.

11. The apparatus according to claim 7, wherein selecting the value from the plurality of candidate lists of depth information to fill the prediction list, to obtain the adaptive prediction list comprises:
initializing a size of the prediction list;
selecting a value of a quantity from the plurality of candidate lists in an order, and filling the value of the quantity into the prediction list; and
adjusting an order of values in the prediction list, to obtain the adaptive prediction list.

12. The apparatus according to claim 11, wherein selecting the value of the quantity from the plurality of candidate lists in the order, and filling the value of the quantity into the prediction list comprises:
inserting a depth information value in the first candidate list into the prediction list, and selectively inserting another depth information value in the first candidate list into the prediction list based on a first threshold;
selectively inserting a depth information value in the second candidate list into the prediction list based on a second threshold when it is determined that the prediction list is not filled currently;
selectively inserting a depth information value in the third candidate list into the prediction list based on a third threshold when it is determined that the prediction list is not filled currently; and
successively inserting a value in the fourth candidate list into a remaining position of the prediction list when it is determined that the prediction list is not filled currently.

13. A method for predictively decoding depth information of a point cloud, wherein the method comprises:
obtaining codestream information and performing decoding;
creating an adaptive prediction list of the depth information of the point cloud; and
recreating the depth information of the point cloud based on the adaptive prediction list and a prediction mode and predicted residual obtained through decoding, to obtain recreated depth information of the point cloud;
wherein creating the adaptive prediction list of the depth information of the point cloud comprises:
creating a plurality of candidate lists of depth information of a point to be currently coded; and
selecting a value from a candidate list of the plurality of candidate lists to fill a prediction list, to obtain the adaptive prediction list;
wherein creating the plurality of candidate lists of the depth information of the point to be currently coded comprises: creating the plurality of candidate lists among a first candidate list, a second candidate list, a third candidate list, or a fourth candidate list, wherein:
depth information values of coded points collected by a laser that is a same as a laser for collecting a depth information value of the point to be currently coded are stored in the first candidate list:
depth information values of coded points collected by a laser different from the laser for collecting the depth information value of the point to be currently coded currently are stored in the second candidate list:
depth information values of historically coded points are stored in the third candidate list; and priori depth information values are stored in the fourth candidate list.

14. The method according to claim 13, wherein creating at least one of the first candidate list, the second candidate list, the third candidate list, or the fourth candidate list comprises creating the first candidate list by:
initializing a size of the first candidate list; and
inserting a depth information value of a currently coded point into an end of the first candidate list when the first candidate list is not currently filled; and updating the first candidate list based on a first-in-first-out principle when the first candidate list is currently filled.

15. The method according to claim 13, wherein creating at least one of the first candidate list, the second candidate list, the third candidate list, or the fourth candidate list comprises creating the second candidate list by:
initializing a size of the second candidate list; and
inserting a depth information of a coded point within a scope right above the point to be currently coded into the second candidate list when the second candidate list is not currently filled, and a point collected by previous q lasers of a current laser has been coded.

16. The method according to claim 13, wherein creating at least one of the first candidate list, the second candidate list, the third candidate list, or the fourth candidate list comprises creating the third candidate list by:
initializing a size of the third candidate list; and
inserting a depth information value of a currently coded point into an end of the third candidate list when the third candidate list is not currently filled; and selectively removing a value in the third candidate list based on a preset threshold, and inserting the depth information value of the currently coded point into the end of the list, when the third candidate list is currently filled.

17. An apparatus for predictively decoding depth information of a point cloud, wherein the apparatus comprises:
at least one processor, configured to:
obtain codestream information and perform decoding;
create an adaptive prediction list of the depth information of the point cloud; and
recreate the depth information of the point cloud based on the adaptive prediction list and a prediction mode and predicted residual obtained through decoding, to obtain recreated depth information of the point cloud;
wherein creating the adaptive prediction list of the depth information of the point cloud comprises:
creating a plurality of candidate lists of the depth information of a point to be currently coded; and
selecting a value from a candidate list of the plurality of candidate lists to fill a prediction list, to obtain the adaptive prediction list; and
wherein creating the plurality of candidate lists of the depth information of the point to be currently coded comprises creating a plurality of candidate lists among a first candidate list, a second candidate list, a third candidate list, or a fourth candidate list, wherein:
depth information values of coded points collected by a laser that is a same as a laser for collecting a depth information value of the point to be currently coded are stored in the first candidate list:
depth information values of coded points collected by a laser different from the laser for collecting the depth information value of the point to be currently coded are stored in the second candidate list:
depth information values of historically coded points are stored in the third candidate list; and
priori depth information values are stored in the fourth candidate list.

18. The apparatus according to claim 17, wherein creating at least one of the first candidate list, the second candidate list, the third candidate list, or the fourth candidate list comprises creating the first candidate list by:
initializing a size of the first candidate list; and
inserting a depth information value of a currently coded point into an end of the first candidate list when the first candidate list is not currently filled; and updating the first candidate list based on a first-in-first-out principle when the first candidate list is currently filled.

19. The apparatus according to claim 17, wherein creating at least one of the first candidate list, the second candidate list, the third candidate list, or the fourth candidate list comprises creating the second candidate list by:
initializing a size of the second candidate list; and
inserting a depth information of a coded point within a scope right above the point to be currently coded into the second candidate list when the second candidate list is not currently filled, and a point collected by previous q lasers of a current laser has been coded.

20. The apparatus according to claim 17, wherein creating at least one of the first candidate list, the second candidate list, the third candidate list, or the fourth candidate list comprises creating the third candidate list by:
initializing a size of the third candidate list; and
inserting a depth information value of a currently coded point into an end of the third candidate list when the third candidate list is not currently filled; and selectively removing a value in the third candidate list based on a preset threshold, and inserting the depth information value of the currently coded point into the end of the list, when the third candidate list is currently filled.

* * * * *

UNITED STATES PATENT AND TRADEMARK OFFICE
CERTIFICATE OF CORRECTION

| | | |
|---|---|---|
| PATENT NO. | : 12,489,920 B2 | Page 1 of 1 |
| APPLICATION NO. | : 18/039633 | |
| DATED | : December 2, 2025 | |
| INVENTOR(S) | : Zhang et al. | |

It is certified that error appears in the above-identified patent and that said Letters Patent is hereby corrected as shown below:

In the Claims

In Column 12, in Claim 3, Line 31, before "into the" delete "currently".

Signed and Sealed this
Third Day of February, 2026

John A. Squires
*Director of the United States Patent and Trademark Office*